United States Patent
Rakhman et al.

(10) Patent No.: US 9,902,831 B2
(45) Date of Patent: Feb. 27, 2018

(54) RE-PROCESSED RUBBER AND A METHOD FOR PRODUCING SAME

(71) Applicant: ECOTECH RECYCLING LTD., Petach Tikva (IL)

(72) Inventors: Moshe Rakhman, Nesher (IL); Tehila Feiglin, Haifa (IL); Oleg Golobrodsky, Petach Tikva (IL)

(73) Assignee: ECOTECH RECYCLING LTD., Petach Tikva (IL)

( * ) Notice: Subject to any disclaimer, the term of this patent is extended or adjusted under 35 U.S.C. 154(b) by 0 days.

(21) Appl. No.: 15/113,898

(22) PCT Filed: Jan. 18, 2015

(86) PCT No.: PCT/IL2015/000001
§ 371 (c)(1),
(2) Date: Jul. 25, 2016

(87) PCT Pub. No.: WO2015/111037
PCT Pub. Date: Jul. 30, 2015

(65) Prior Publication Data
US 2016/0347926 A1    Dec. 1, 2016

(30) Foreign Application Priority Data

Jan. 23, 2014 (IL) .......................................... 230638

(51) Int. Cl.
| | | |
|---|---|---|
| *C08J 11/22* | (2006.01) | |
| *C08C 19/08* | (2006.01) | |
| *C08J 11/10* | (2006.01) | |
| *C08J 11/18* | (2006.01) | |
| *C08J 11/20* | (2006.01) | |
| *C08L 19/00* | (2006.01) | |
| *C08J 11/16* | (2006.01) | |
| *C08L 21/00* | (2006.01) | |

(52) U.S. Cl.
CPC ............... *C08J 11/22* (2013.01); *C08C 19/08* (2013.01); *C08J 11/10* (2013.01); *C08J 11/16* (2013.01); *C08J 11/18* (2013.01); *C08J 11/20* (2013.01); *C08L 19/00* (2013.01); *C08L 21/00* (2013.01); *C08J 2300/24* (2013.01)

(58) Field of Classification Search
CPC ....................................................... C08G 11/22
USPC ...................................................... 521/40, 41
See application file for complete search history.

(56) References Cited

U.S. PATENT DOCUMENTS 6,924,319 B1    8/2005   Alsdorf et al.
2010/0099800 A1 4/2010   Ueno et al.

FOREIGN PATENT DOCUMENTS

EP    2123711 A1    11/2009

*Primary Examiner* — Terressa Boykin
(74) *Attorney, Agent, or Firm* — Browdy and Neimark, PLLC

(57) ABSTRACT

A method is provided for preparing a reprocessed rubber from thermoset rubber particles. The method includes providing a plurality of thermoset rubber particles, inducing dynamic swelling and dynamic compatibilization of the plurality of rubber particles, admixing at least one de-linking agent with the swelled and wetted rubber particles, and wherein the step of admixing the at least one de-linking agent is carried out under thermo-mechanical mixing.

17 Claims, 1 Drawing Sheet

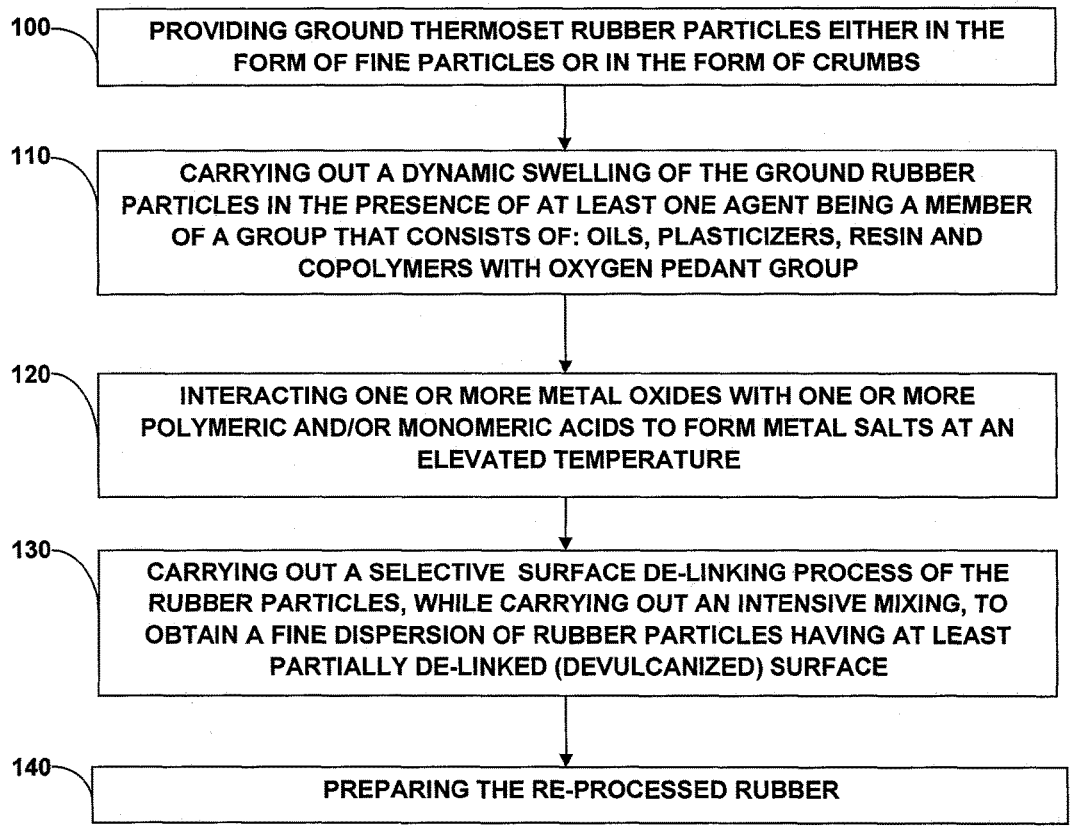

RE-PROCESSED RUBBER AND A METHOD FOR PRODUCING SAME

TECHNICAL FIELD

The present disclosure generally relates to re-processing thermoset rubber, and more particularly, to re-processing of rubber particles that can be re-compounded and re-cured.

BACKGROUND

One of the well-known environmental challenges nowadays is the handling of used tires. There are estimations that every year, at least one billion tires are discarded around the world. These scrap tires are an ecological predicament in all countries in which automobiles and trucks are a standard mode of transportation. Over the years, many more tires cast off in monumental piles than recycled or burned. It is estimated that in the US alone there are in excess of 1 billion tires in illegal tire piles, generating dangerous conditions of uncontrollable fires, air pollution as well as health hazards.

To date, most discarded tires are burned, assisting in alleviating an unending energy crisis. However, since the recognition by meteorologists of pending earth-warming trends, burning tires is quickly becoming an unacceptable solution, and in some countries even an illegal one. Furthermore, to date, many of the waste tires are simply shredded and buried in landfills. This solution has also become an undesirable one as more and more countries recognize the danger in underground buried tires or tire parts, due to the adverse effect on diminishing underground supplies of fresh water. In addition, tire piles serve as breeding grounds to colonies of disease infected rodents and incubation hot beds for dangerous and deadly insects. It is therefore becomes clear that recycling must be the only acceptable and sustainable solution to the increasing problem of scrap tires. However, in order to ensure that recycling is indeed the acceptable solution to the problem, the quality of the product received in a recycling process must be such that it will be suitable for the various uses of these products.

Ground Tire Rubber (hereinafter: "GTR") powder may be prepared by at least two different processes, and the surface morphology of the rubber particles is expected to depend on the method of their production. The size, shape and morphological features of the particles' surface, can affect the properties of the end products, the polymer/rubber composites.

Ambient ground rubber is obtained by shredding and grinding (milling) the tire rubber at or above ambient temperature. This process produces a sponge-like surface of the granulated rubber crumbs which have considerably greater surface area for a given particle size, than do cryogenically ground rubber particles.

Cryogenically ground rubber is obtained by grinding (turbo milling) the tire rubber at below the brittle temperature (glass transition temperature) of the rubber. However, the cryogenic process may produce undesirable particle morphology (structure) and might generally give a lower elastic recovery when compared with the ambient ground rubber.

Vulcanized rubber may be retrieved from various rubber materials. For example, from rubber products such as rubber tires, weather strips, hoses, piston cups, belts, floor carpets and the like, or any other used rubber materials that are to be disposed, non-used materials such as scraps of virgin rubber materials and unsuccessfully molded rubber articles. Although various types of rubber materials may be used in a mixture, still, it is usually preferred to use a single type of material in order to obtain a reclaimed article having stable properties.

GTR crumb is a cluster of hydrocarbon main chains with mono-, di-, polysulfidic cross-links having developed surface and configuration. The average molecular weight of the rubber can be maintained at a high level of over 100,000 and typically over 150,000. In some cases, an average molecular weight of over 200,000 may be maintained.

The major drawback of using conventional crumbs is that the cross-link bonds created by the vulcanization process are relatively very strong. This fact results in rubber compound molecules having a "memory" effect, which enables rubber items to regain their original shape after being subjected to a deforming force. For example, a rubber band that has undergone stretching will return to its original shape. Therefore, even when GTR is processed into crumbs, the rubber molecules retain much of their physical properties. The strength of the cross-link bonds makes binding of the crumb rubber within a virgin rubber matrix rather difficult, whereas the bonding between the new rubber and the GTR is weak.

GTR powders are typically inert materials and are non-compatible with virgin elastomer matrix materials. Thus, combining GTR with various polymers results in compositions that exhibit poor properties due to the weak interfacial adhesion existing between the crosslinked GTR particles and the polymer. Consequently, GTR powders are of limited use as filler in rubber or plastic compositions, as high levels of GTR generally lower the rheology and overall physical properties of rubber compositions. As such, less than 4% by weight of GTR may commonly be mixed when manufacturing new tires, as when higher percentage of GTR is mixed while manufacturing the compositions, the new tires' properties such as strain modulus begin to degrade.

Reclaimed GTR is a crumbed rubber which was treated with aggressive chemicals that attack the carbon backbone as well as other molecular bonds. The resultant rubber material is typically reused (recycled) in small proportions as processing aids ("reclaimed rubber") or as diluents with fresh rubber compounds. However, the presence of reclaimed rubber in such mixtures, adversely affects the physical and dynamic properties of the final vulcanizate. Rubber which was reclaimed by using such approaches tends to demonstrate poor physical properties.

Reclaimed GTR is a crumb rubber that was treated either mechanically or under combination of mechanical and chemical processing, in order to break most of the sulfur cross-links as well as some of the carbon chains. The problem associated with this type of technology is the non-homogeneous de-vulcanization, which is caused by poor diffusion of the chemical agent into the rubber particles.

Unfortunately, various reclaiming processes have certain drawbacks that limit their use on a large scale, as some of the processes involve relatively high temperatures. The use of high temperatures combined with mass transfer limited reactions, lead to a greater opportunity for thermal degradation reactions to occur.

Furthermore, the slow reaction rate also leads to thermal cracking of the polymer, which in turn reduces the molar mass of the reclaimed polymer, thereby degrading the mechanical properties, while producing light hydrocarbon gaseous products. Thermally degrading reactions might shorten the length of rubber polymer chains or otherwise change their chemical structures such that their mechanical properties are adversely affected, thereby limiting their potential use in new rubber products.

Certain current methods use high temperatures (e.g., 150-250° C.) to digest the elastomeric material being recycled, and require stirring of the mixture for many hours (e.g., 5 to 12 hours). This results in processes that are characterized as high energy consumers and the end result is a degraded material that is being reclaimed. For example, the intense heat and mechanical shear actions of a thermo-mechanical process might cause some polymeric chain backbone to break down. In addition, because this process does not use chemicals, it is not possible to selectively cleave targeted polysulfidic bonds. Some processes, such as solvent extraction, utilize large quantities of chemicals or solvents that might damage the environment, or otherwise involve follow up complicated solvent or chemical recovery and treatment processes. Still, other reclamation processes, such as microwave or ultrasonic processing, employ relatively complicated equipment that is difficult to obtain and difficult to operate efficiently on an industrial production scale.

Rubber that has been reclaimed by using such approaches tends to have poor physical properties. For example, conventionally reclaimed rubber may have tensile strength of about 3.5 to 5 MPa, elongation of 200-250% while natural rubber may have tensile strength over 20 MPa and elongation of above 400%.

Therefore, there is a need for a rubber composition that comprises GTR and a method for manufacturing such a product, that do not compromise desirable properties of the rubber composition.

SUMMARY OF THE DISCLOSURE

The disclosure may be summarized by referring to the appended claims.

It is an object of the present disclosure to provide a GTR and a method for its reprocessing, wherein the surface of the reprocessed rubber crumbs is suitable for being re-compounded and re-cured by itself or for being co-cured with a virgin elastomer.

It is another object of the present disclosure to provide a method for modifying the surface of GTR, without affecting the particle's bulk properties, i.e. without affecting the material contained within the particles.

It is yet another object of the present disclosure to provide a method for modifying the surface of cured rubber crumbs, which is simple and relatively cheap to carry out.

It is still another object of the present disclosure to provide an environmentally friendly method for producing TRR which requires a shorter period of time at high temperatures, thereby avoiding risks of rubber cracking and spontaneous combustion.

Other objects of the present invention will become apparent from the following description.

According to a first embodiment of the present disclosure there is provided a method for producing a reprocessed rubber from thermoset rubber particles, comprising the steps of:

providing a plurality of rubber particles derived from thermoset rubber;

inducing dynamic swelling and dynamic compatibilization of the plurality of rubber particles (e.g. by adding an appropriate agent thereby resulting in having dynamic swelling and dynamic compatibilization of the rubber particles);

admixing at least one de-linking agent with the swelled and wetted rubber particles; and wherein the method is further characterized in that the step of admixing the at least one de-linking agent is carried out under thermo-mechanical mixing, preferably a mixing that enables generating shearing forces while mixing the components comprising the mixture.

The terms "thermoset rubber", "rubber particles" and "rubber crumbs" as used herein throughout the specification and claims are used interchangeably to denote thermoset type of rubber, which is in the form of crumbs or particles, or a combination thereof.

According to another embodiment, the at least one de-linking agent comprises a transitional metal oxide and alkaline-earth metal oxide/hydroxide combination with acid functionalized polymer and/or monomeric organic/inorganic acids or acid precursor.

By yet another embodiment, the method provided is further characterized in that the step of admixing at least one de-linking agent is carried out in a presence of hydro-aromatic compounds.

In accordance with still another embodiment, the step of inducing dynamic swelling and dynamic compatibilization of the plurality of rubber particles, comprises using at least one compound from the group that consists of a trialkyl phosphate ester, tall oil, naphthenic oil, paraffinic oil, aromatic oil (that matches the polarity of the thermoset rubber particles), and mixtures thereof.

According to another embodiment, the step of admixing at least one de-linking agent comprises admixing a monomeric acid for activating the thermoset rubber.

In accordance with another embodiment, the monomeric acid is selected from among a linear alkylbenzenesulfonic acid (LABSA), a boric acid, a phthalic acid or anhydride, a tall oil or rosin being a mixture of monocarboxylic acids.

By yet another embodiment, the step of admixing at least one de-linking agent comprises admixing an acid precursor selected from among a di-ammonium phosphate, mono-ammonium phosphate, ammonium polyphosphate and ammonia in the presence of calcium hydroxide.

According to still another embodiment, the hydro-aromatic compound is selected from among cumarone, phenolic resin and aromatic oil.

In accordance with another embodiment, the transitional metal oxides comprises at least one metal salt precursor that is operative as a catalyst during the thermal mixing to activate polysulfidic crosslink scission via nucleophilic breakdown and oxidation According to another embodiment, the transitional metal oxides and alkaline-earth metal oxide/hydroxide are selected from a group that consists of: iron (III) oxide, zinc oxide, manganese oxides, cobalt oxide, calcium oxide/hydroxide, acid functionalized polymer, monomeric acids as salt precursors and any combination thereof.

By still another embodiment, the thermoset rubber particles are heated to a temperature in the range of from about 130° C. to about 220° C.

According to another aspect of the disclosure, there is provided a method for converting a thermoset rubber particles into a reprocessed rubber, wherein the method comprises the steps of: a) adding at least one dynamic swelling and a dynamic compatibilization agent to the thermoset rubber particles, b) adding at least one dynamic de-linking agent for selectively modifying the surface of the thermoset rubber particles, and c) carrying out a thermo-mechanical mixing of the at least one dynamic de-linking agent and the thermoset rubber particles.

Preferably, the step of carrying out the thermo-mechanical mixing is conducted at a temperature below a temperature at which the elastomer begins to degrade.

It should be noted that steps (a), (b) and (c) may be carried out simultaneously or separately.

According to another aspect of the disclosure there is provided a reprocessed rubber, produced from a plurality of particles of used rubber and characterized in that each of the plurality of rubber particles has a core and a shell, and wherein the core of each of the plurality of rubber particles is substantially chemically different from the shell of that respective particle.

According to an embodiment of this aspect, each core of the plurality of rubber particles comprises vulcanized rubber and each shell of the plurality of rubber particles includes de-vulcanized rubber. In other words, sulfur links that had been comprised in the particles' shells prior to its reprocessing are cleaved, and are capable of being de-vulcanized.

According to another embodiment of this aspect, each core of the plurality of rubber particles comprises thermoset rubber gel and each shell of the plurality of rubber particles includes de-vulcanized rubber.

In accordance with another embodiment, the gel content of the plurality of rubber particles is at least about 80%.

BRIEF DESCRIPTION OF THE DRAWINGS

For a more complete understanding of the present invention, reference is now made to the following detailed description taken in conjunction with the accompanying drawing wherein:

FIG. 1—is a flow diagram exemplifying a method carried out in accordance with an embodiment of the present invention.

DETAILED DESCRIPTION

In this disclosure, the term "comprising" is intended to have an open-ended meaning so that when a first element is stated as comprising a second element, the first element may also include one or more other elements that are not necessarily identified or described herein, or recited in the claims.

In the following description, for the purposes of explanation, numerous specific details are set forth in order to provide a better understanding of the present invention by way of examples. It should be apparent, however, that the present invention may be practiced without these specific details.

The following terms, as used herein throughout the specification and claims, have the following meanings:
Devulcanization—breakage/cleavage of sulphur bonds/links;
Depolymerization—scission/breaking of carbon backbones;
Auto-adhesion—tack;
TRR—reprocessed rubber; and
TRR base batch—re-compounding the reprocessed rubber by itself without adding virgin rubber thereto.

As explained hereinabove, the present disclosure generally relates to reprocessed rubber (e.g. tires' rubber) that can be re-compounded and re-cured. For the convenience of the reader, the term TRR will be used hereinafter to denote reprocessed rubber according to the present disclosure.

According to one embodiment of the disclosure, the TRR may be re-compounded by itself (e.g. without adding virgin rubber thereto) as a substitute for rubber compounds, such as those used for floor and roofing membranes. Various experiments have demonstrated that elastomeric compositions that are based solely on reprocessed rubber prepared in accordance with the present invention, exhibit good functional properties.

In an alternative embodiment, the solution described herein provides elastomeric compounds (such as those used for vehicle tires) that comprise TRR, and which are re-cured with virgin elastomers. Experiments have demonstrated that elastomeric blends (e.g., tread rubber compounds) incorporating reprocessed rubber described herein, may comprise from 10 phr up to 40 phr, where phr being "Parts per Hundred Rubber", a measure used to depict what amount of certain ingredients is used.

According to an embodiment of the disclosure, the method provided comprises the following steps:
a) Reducing scrap rubber or used tires to fine particles or crumb.
b) carrying out dynamic swelling of GTR in the presence of oils, plasticizer, resin and copolymers with oxygen pendant group. The small particulate exhibit high surface area to volume ratios, thereby enable good surface interaction between the binder and the rubber particles.
c) carrying out dynamic selective surface de-linking by allowing interaction of transitional metal oxide and alkaline-earth metal oxide/hydroxide combination with acid functionalized polymer and monomeric organic/inorganic acids or acid precursor that modify the thermoset rubber surface in the presence of hydro-aromatic compounds as hydrogen source, while carrying out intensive mixing or kneading.

Upon following the above process, the TRR outer shell is modified to enhance the ability of the surface of the modified rubber to be incorporated into the mixture and increase the recyclability of rubber scrap without causing substantial degradation of the product's physical properties.

The de-linking agent according to the present disclosure is preferably used in an effective amount, which means that de-linking agent to be used, comprises a combination of acids and metal oxides that are precursor for salts in an amount that provides in-depth treatment and surface modification.

As already mentioned hereinbefore, the advantages of the present invention overcome many of the drawbacks of the prior art processes. The process disclosed herein may be carried out in a matter of several minutes, requiring consumption of much less energy while retaining better physical properties of the product when compared with conventional thermo-mechanical processes. The process disclosed herein utilizes very small quantities of non-toxic chemicals having no environmental impact and no need for recovery after carrying out the process.

Typically, when GTR is added to a rubber composition, it is accompanied by certain degradation of performance. Modifications of the GTR surface lead to an improved interaction between the TRR itself and/or with the virgin elastomer matrix materials.

Let us now consider the following example illustrated in FIG. 1, of a method carried out according to an embodiment of the present disclosure.

The first step of the method is providing ground rubber particles (e.g. thermoset rubber) either in a form of fine particles or in the form of crumbs or a combination thereof (step 100). These ground rubber particles may be obtained from processing factory scrap rubber, from processing used tires, etc.

Next, adding at least one agent to enable dynamic swelling and dynamic compatibilization of the GTR (step 110), e.g. at least one agent from the group that consists of oils, plasticizer, resin and copolymers with oxygen pendant group. Relatively small particles exhibit high surface area to volume ratios, thereby enabling optimal surface interaction between the binder and the rubber particles.

The following step (step 120) involves interacting one or more metal oxides with one or more polymeric and/or monomeric acids to form metal salts of transitional metals used as catalysts. This step is carried out by mixing the reactants at elevated temperature.

Next, carrying out a selective de-linking step, step that affects mainly the surface of the rubber particles. This step is carried out according to this example while carrying out an intensive mixing or kneading process. The step yields a fine dispersion of rubber particles having at least partially de-linked surface (step 130). This latter step is followed by compounding the product thus obtained into a reprocessed rubber (step 140).

According to one aspect of the present disclosure, the use of the chemical agents when combined with the mixing action of the mixer while providing the appropriate shear, pressure, dwell time, and temperature, determine eventually the properties of TRR batch obtained.

Shear generated free radicals are grafted to the polymer molecules during the mixing. More particularly, in the experiments conducted, a specialized twin-screw extruder or Banbury mixer were used to thoroughly mix the rubber crumbs to selectively treat sulfur cross-links in rubber crumbs' surface without substantially degrading the properties of the core (backbone) polymer.

The method described herein is environmentally friendly, since it requires a shorter period of treatment at higher temperature, consumes substantially less amount of energy and yields products having improved physical properties compared with conventional thermo-mechanical processes, which in turn leads to avoiding the risks of rubber cracking and spontaneous combustion, and allows mass-production of reprocessed rubber under lower energy consumption.

The process disclosed herein utilizes very small quantities of non-toxic chemicals having no environmental impact, which do not need to be recovered after completing the treatment. The safe and efficient chemical agents described herein, have no additional odors and low impact on the process for the replacement of virgin rubber in products.

Dynamic Swelling of GTR

The wetting agent operates as a de-flocculent for the GTR, an optional dispersant, or a surface active agent, and an emulsifier for the crumbs. During mixing, the surface of the particles become emulsified and swelled in a large colloidal form, charged with a cationic or anionic surface charge, thereby allowing for better dispersion and integration into the compound.

The thermoset rubber phase should preferably be neutralized from particle charges, in order to allow essentially a complete wetting out the surfaces of the GTR particles. The mixture is preferably processed until it becomes substantially homogeneous so that there are no separate phases when viewed under a microscope.

Reactive compatibilization improves the interfacial adhesion between the phases and allows control of the size and distribution of the rubber particles, all of which are key factors in promoting strength. Copolymers comprising oxygen-containing pendant groups are considered as preferred means to provide adhesion to the tire crumb due to the affinity between the oxygen-containing pendant groups and the polar sites at the vulcanized rubber polymer.

The functionalized polymer is particularly useful for compatibilizing the relatively non-polar copolymers. The vinylacetate and acrylic units decrease the interfacial tension during mixing, resulting in uniformly distributed rubber particles in the oil-polyolefin matrix.

Compositions that are useful for carrying out the method described herein contain aromatic resins as binders, deflocculant and viscosity control agents. Suitable tackifiers include, but are not limited to, aromatic resins, an oligomer or copolymers of styrene and maleic anhydride, and the like.

Two factors are considered to have the major influence on adhesion of any polymer to a substrate, namely, the chemical interactivity of the polymer and the substrate surface molecules (generally, adhesion to polar materials increases along with the increase in the co-monomer content); and the ability of the coating or adhesive to flow and "wet out" the substrate.

The term "compatibilized" as used herein throughout the specification and claims is used to denote materials forming a stable multiphase morphology where the phases do not significantly coalesce and/or increase in size upon aging at temperatures at or above the glass transition temperature (Tg) or melting temperatures of the respective materials. The compatibilization scheme comprises functionalizing an olefin-based polymer in such a way that an acid-base interaction exists between the two materials. This acid-base interaction that exists between the polymers may be described as being a Lewis acid-base type interaction which requires that one chemical component be an electron acceptor (acid) and the other an electron donor (base). The following general equation describes the Lewis acid-base interaction:

$$A(\text{acid}) + :B(\text{base}) = A:B(\text{acid-base complex})$$

The acid-base interactions between the polymers reduce their interfacial tension, leading to a reduction in the dispersed phase particle size and stabilization of the multiphase morphology.

According to the compatibilization scheme, the thermoplastic olefin-based polymers may be acid functionalized and rubber crumb is base functionalized (amine-terminated chains as result amine accelerator action).

Dispersion of GTR crumbs with developed surface and configuration provides conditions for in-depth surface treatment. Larger cross-linked GTR domains are heterogeneously dispersed within the swollen oil-resin phase.

Swelling Agents

The swelling agent should preferably be selected on the basis of solvency for de-linked rubber and/or the ability to swell cured rubber. Processing oil also enables wetting and penetration of the chemicals deep into the GTR. Oils may improve other properties of the blend (e.g. ultimate tensile strength) due to changing phase sizes of the rubbery particles.

Plasticizers have a high tackiness that enables a layered and controlled application of the chemicals (docking) onto the rubber granule surface. The processing oils are preferably a mixture selected from hydrocarbon oil, rosin acids, fatty acids, dimerized and trimerized fatty acids, and the like.

A swelling oil has several roles apart from raising the plasticity of the TRR, such as being an accelerating agent in the oxidation action of the rubber and a gel preventing agent by acting as a radical acceptor. It also facilitates the dispersion of the de-linking agent into the rubber matrix. Suitable swelling oils often have active double bonds or methylene groups in the molecules.

Because of their relatively small molecules, plasticizers may penetrate a polymer network without participating in the de-linking process so that they allow deep reaction of sulfur scavengers with the swelling GTR. The major factor in selecting a plasticizer is preferably its solubility parameter. Triaryl esters of phosphoric acid, diaryl alkyl esters of phosphoric acid, trialkyl esters of phosphoric acid and/or aryl esters of alkanesulphonic acids have high solubility values and therefore may provide the optimum wetting and dispersion of chemicals (metal oxides) into re-processed rubber.

Dynamic Surface De-Linking and Modification

One of the mechanisms on which the present disclosure relies is the use of transitional metal oxide and alkaline-earth metal oxide/hydroxide combination with acid functionalized polymer and monomeric organic/inorganic acids acting as metal salt precursor, which modifies the thermoset rubber surface in the presence of hydro-aromatic compounds being a hydrogen source, and the reaction takes place while applying thermal mixing. The result is dynamic de-linking of the GTR surface and inhibiting recombination of sulfur radicals.

Upon carrying out the de-linking step, the phase comprising the GTR is dispersed finely within a matrix while the sulfur cross-links are cleaved to generate a large amount of radicals. Formation of main chain radicals and breaking the crosslinks, result in viscosity reduction. Certain characterizing features of a rubber de-linking process are demonstrated in the following Table 1.

TABLE 1

Characterizing features of a rubber de-linking process

| De-linking mode | Aids | Function |
| --- | --- | --- |
| Radical breakdown | Acids, Metal salt; Diols; Aromatic as a source for hydrogen | Blocking of sulfur radicals disproportioning of sulfur radicals |
| Nucleophilic breakdown | Metal Hydroxides | Sulfur scavenger - cleavage of sulfur bonds |
| Thermal oxidation | Oxygen (air); Iron oxide | Sulfur links and backbone scission |

Acid Functionalized Polymer

The polymeric acid precursor materials include polymers and oligomers that hydrolyze or degrade under certain chemical environments and under known controllable conditions of temperature, time and pH, to release organic acid molecules that, as in the foregoing, are referred to as "monomeric organic acids."

Functionalized polymers that have functional groups may be selected from the group that consists of carboxylic acid and anhydride.

Examples of copolymers of ethylene with at least one ethylenically unsaturated ester which may be used in the method provided herein are: ethylene/vinylacetate copolymer (EVA), which releases acetic acid while heating, ethylene/acrylic acid copolymer (EAA), copolymers with anhydride groups; styrene sulfonic acid copolymer, a vinyl sulfonic acid copolymer, block and random copolymers of lactic acid, glycolic acid.

Degradation of the precursor proceeds throughout the hydrolysis or transesterfication process, and results in generation of monomeric organic/inorganic acids.

The process for a surface de-linking in accordance with an embodiment of the present disclosure, may comprise the steps of:
a) heating the oil-swollen GTR in the presence of an acid precursor;
b) carrying out a thermal surface de-linking in the presence of hydrogen source for a period of time sufficient to effectively surface devulcanize the material.

Monomeric Organic/Inorganic Acid

Following are some examples of compounds which may serve as acid additives according to the present disclosure. These are: linear alkylbenzenesulfonic acid (LABSA), boric acid, phthalic acid or anhydride, paratoluene sulphonic acid, methane sulphonic acid, acetic acid, benzoic acid, acid clay, rosin (a mixture of monocarboxylic acids having a hydrophenanthrene nucleus) such as a tall oil or pine tar.

Crude tall oil is typically composed of fatty acids (ca. 45-55 wt %), resin acids (ca. 35-45 wt %), and neutral (e.g., non-acidic) materials (such as terpenic-compounds and phenolic-compounds, total ca. 5-10%). Crude tall oil refiners typically fractionate to provide "cuts" (or distillation ° fractions) that have various compositions and properties. The cuts are tall oil fatty acids (25-35 wt %), distilled tall oil (5-15 wt %), tall oil rosin (25-35 wt %) and pitch (15-25 wt %).

Acid Precursor

Ammonium polyphosphate is an inorganic salt of polyphosphoric acid and ammonia. The chain length (n) of this polymeric compound is both variable and branched, and may exceed 1,000. Short and linear chain APPs (where n<100) are more water sensitive (hydrolysis) and less thermally stable than longer chain APPs (where n>1000), Long chain APP starts to decompose at temperatures above 300° C. to polyphosphoric acid and ammonia. Short chain APP on the other hand, would start to decompose at temperatures above 150° C.

Monoammonium phosphate (MAP) is more stable than Diammonium phosphate (DAP) and also releases ammonia and acid in the presence of calcium hydroxide.

Ammonia and acid are released through mechano-chemical operation from a dry powder mixture of calcium hydroxide and ammonium hydrogen phosphate. The presence of various inorganic acidic compounds enhances the performance of the first degradation pathway by catalyzing the dehydration reactions. Some acidic compounds may be formed during the decomposition of MAP and DAP (as may be seen in the following reactions).

Following are Diammonium phosphate decomposition reactions:

$$(NH_4)_2HPO_4 \rightarrow NH_3 + NH_4H_2PO_4 \text{ (at 155-160°)}$$

Monoammonium Phosphate Decomposition:

$$NH_4H_2PO_4 \rightarrow NH_3 + H_3PO_4$$

Phosphoric Acid Decomposition:

$$H_3PO_4 \rightarrow H_2O + H_4P_2O_7 \text{ (at 170-190°)}$$

$$H_4P_2O_7 \rightarrow 2H_2O + P_2O_5$$

Hydrogen may be exchanged at the rubber surface area and the bound hydrogen would be placed at the edges of the large aromatic ring molecule.

When a source of hydrogen, such as aromatic compounds, is available, a hydro-de-linking reaction takes place simultaneously at the surface of the rubber crumb.

It should be noted that the processing temperature is preferably at or above the activation or decomposition temperature of the free radical generating compound. Eventually, this temperature will vary depending on the thermoplastic component utilized in the process. Further, any one of a variety of effective blending techniques may be used, and the scope of the present disclosure is not limited to any particular blending technique(s).

In addition, processing oils and resins may be a source for hydrogen.

Nucleophilic Breakdown with Metal Salt Precursors (Metal Oxides/Hydroxides)

Polysulfidic crosslink scission via nucleophilic breakdown should be carried out with a sulfur scavenger under oxidation. To accelerate oxygen fixation, such transitional metal oxide and alkaline-earth metal oxide/hydroxide combination with acid functionalized polymer and monomeric organic/inorganic acids or acid precursor are metallic salt precursor that catalyzes oxidation, in particular as iron (III) salt. The salt acts by activating homolytic decomposition of the hydroperoxides generated during mixing at elevated temperature, and accelerates cleavage of sulfur bonds.

In order to achieve the objects of the present disclosure, according to one of its embodiments, the Calcium oxide/hydroxide-Iron(III) oxide and its salts are used in the process as they would convert thiols or hydrogen sulfide into disulfides and would dissolve sulfur, thereby providing the de-linking at GTR surface.

The metal oxide may be an iron oxide, an iron hydroxide, a zinc oxide, a manganese oxide, a calcium oxide/hydrate and any combination thereof.

When acid and metal oxides are added to the GTR particles, the COOH group and the metal salt attack the sulfur bond at the GTR particles' surface. Since acid easily donates the hydrogen of its COOH group, the hydrogen interacts with active sulfur atom and prevents the sulfur from reacting with other sulfur atoms. The sulfur bond is therefore broken, but the sulfur is not removed from the GTR. Furthermore, the sulfur which has been blocked, is capable of later re-activation. The thiol forms an ester bond with the carboxyl group directly.

Thermal Oxidation

The sulfur crosslinks may be directly oxidized with the dissolved oxygen in the GTR to form disulfides, without feeding air or oxygen during the oxidization process.

Metal oxides/salts activate homolytic decomposition of the hydroperoxides generated during mixing. Even small amounts of reactive functional groups incorporated within the TRR, may be highly beneficial for improving surface characteristics and wettability.

Upon heating the above described mixture, the metal oxide precursor is converted into an active salt through contact and reaction with any of the forms of sulphur which is normally present in a vulcanized rubber, including bridge sulphur or organosulphur compounds.

As already explained, the formulation of transitional metal oxide and alkaline-earth metal oxide/hydroxide combination with acid functionalized polymer and monomeric organic/inorganic acids or acid precursor, results in modifying the surface of the thermoset rubber in the presence of hydro-aromatic compounds as hydrogen source, while thermal mixing may influence the formation of metal salts that act as catalyst for sulfur bonds cleavage into re-processed rubber.

Topography of TRR Surface

During the dynamic de-linking process, an outer layer of rubber crumb (a shell) consisting of the desulfurized elastomer-carbon black gel will again be capable of being cured with sulfur.

A core/shell configuration refers generally to a TRR having at least two defined regions, in which one viscoelastic cured region (referred to herein as "core") is substantially surrounded by another viscous region (referred to herein as "shell").

The higher is the ratio of the de-linked shell volume to the visco-elastic core volume (i.e. the smaller is the crumb), properties of the rubber composition are enhanced. However, for economic reasons, it may be desirable to minimize the volume of the devulcanized outer shell and maximize the volume of the cured core. The crumb size may therefore be controlled in order to achieve desired physical and/or chemical properties of the resulting rubber compositions, into which the TRR is re-compounded.

The heterogeneous complexity of the interphase TRR may provide overall benefits to compositions, such as reduced rolling resistance and increased traction.

The de-linking technique of the solution provided by the present disclosure provides a significant conversion to the original microstructure of the outer shell. In other words, the reprocessed rubber may be re-compounded and re-cured at substantially the same way as the virgin rubber.

Generally speaking, the solution provided by the present disclosure enables modifying the material surface, without substantially affecting the bulk properties thereof, i.e. without affecting a meaningful change to the internal material, throughout the particle.

The TRR demonstrates improved properties such as auto-adhesion or tack, cohesion, adhesion with other polymers, etc. Furthermore, it has been noted that the tack state of the TRR remains unchanged for a long period of time.

Producing the TRR

The process provided by an embodiment of the present disclosure comprises a number of steps which may be carried out by using conventional rubber processing equipment while ensuring that heat and high shear forces are being developed in the process.

The flowable product resulting from the process has a reduced inherent tackiness. The tackiness of the particles (relative to one another) results in a product which may be characterized as having a delayed flow ("crawling") while being poured. For improving the flowability and pouring properties of the material, a significant improvement may be achieved by using about 0.5 to about 1.0 part of highly dispersed hydrophilic silicic acid and/or kaolin.

It is typically preferred for the de-vulcanization process to be carried out at a temperature which is within the range of from about 120° C. to about 280° C., more preferably, from about 150° C. to about 200° C.

The primary functions associated with the step of GTR mixing are dispersion and distribution of all the additives within the polymer matrix-GTR and solid block formation. Mixing is a critical step in determining the performance characteristics of the rubber compound.

First, a mixture of swelling oil and de-linking formulation are introduced and mixed with the GTR, preferably at an elevated temperature. The mixing may be carried out in a batch process, or in a continuous process or by applying a combination of batch and continuous mixers. Batch mixers, such as tangential and intermeshing mixers, in combination with a single screw-extruder may be used. Continuous mixers such as twin-screw extruders may be used. An embodiment of the method provided, comprises a step of increasing the speed of the rotor shaft, in order to increase the temperature to which a mixture of cured crumb rubber and a de-linking formulation are subjected to, until a de-linking temperature is reached.

The rubber crumb undergoes de-linking for a period of time that is sufficient to substantially de-vulcanize the shell of the crumb particles without de-vulcanizing the rubber at the core of the crumb particles. The preferred period of time required to de-vulcanize the surface of the rubber crumb particles, depends on the temperature, the shear and the particle size of the rubber crumb. However, the time for the de-linking operation was typically within the range of from about 5 minutes to about 60 minutes. The de-vulcanization may typically be carried out over a period of from about 10 minutes to about 30 minutes.

During the mixing operation, the mixture temperature rises due to friction development. The mixing operation should continue at a speed from about 50 to about 80 rpm, preferably at about 60 rpm, until the temperature reaches about 120° C. Then, the mixer's speed may be reduced to about 30 rpm for about one to about two minutes. If there is no variable speed motor, then the temperature of the chamber should be maintained at about 190° C. for the one to two minutes mixing period, particularly if natural rubber based scrap or used tire rubber scrap, is the vulcanized rubber scrap material component of the mixture. The resulting rubber mixture is then transferred directly to a dump extruder, which extrudes the final composition into water trough that leads to a jet air blower to remove surface moisture followed by a rotary pelletizer (cutter).

In addition, lower temperature reclamation is possible under a higher shear stress, since the heat stability of the crosslinkings is reduced by means of the shear stress given to the vulcanized rubber and the thermoplastic resin.

This process is relatively a simple, low cost and environmental-benign process for surface tire rubber devulcanization. Absence of current reclaiming agents such as aryldisulphides, results in excellent scorch resistance and in an odorless process.

In addition, it should be noted that the process provided by the present invention does not require complex heating or cooling equipment, nor does it require use of liquids or slurries that tend to clog extruders. Thus, the process of the present invention is a much simpler procedure that involves lower costs and provides higher economical benefits, than processes known in the art.

The process disclosed herein may be performed within a period of several minutes, which means that carrying out this process consumes much less energy and while achieving better physical properties of the product when compared with products obtained by using conventional thermo-mechanical processes. Furthermore, the process provided herein utilizes very small quantities of non-toxic chemicals resulting in no environmental impact and no need to recover these chemicals after carrying out the process.

The resulting mixture (which is sometimes referred to hereinafter as the "base mixture") was transferred to an internal mixer (or Banbury mixer) which was fitted with a dump extruder and pelletizing facilities such as those common in conventional plastic processing lines.

TRR obtained in a process such as the process described herein, may be used directly, without binders, to form 100% recycled rubber products. In addition, TRR of the present invention may be combined with fresh compounds when higher physical properties are required. The amount of fresh compound to be added, depends on the intended final use of the product. Depending on performance requirements, about 5 phr to about 20 phr of fresh rubber may be substituted by TRR of the present disclosure without experiencing any significant loss of properties.

Testing the Reprocessed Rubber Produced

In order to further illustrate the present invention, the following examples are provided. However, it is to be understood that the examples are for illustrative purposes only and are not to be construed as limiting the scope of the subject invention.

The mechanical properties of a vulcanized TRR in a rubber composition vary depending on the reclamation degree of the GTR surface. The reclamation degree of a vulcanized rubber may be represented as a weight swelling degree of a vulcanized rubber reclaimed material in a rubber composition or a percentage by weight of a gel (gel fraction).

When the weight swelling degree of a vulcanized TRR in a rubber composition is lower than twice the degree before reclamation, the reclamation is insufficient, and a mixture in which a vulcanized rubber pulverized by a shear stress is merely admixed with a thermoplastic resin is obtained. In such a mixture, the TRR is poorly dispersed and may cause deterioration of mechanical properties. As a result, a rubber composition according to the present invention may not be obtained. The percentage by weight of a gel of a rubber polymer component in a rubber composition is preferably 10 to 50% by weight of rubber polymer component of the vulcanized rubber. If a gel is present in an amount that is less than 30%, it might cause not only the cutting of the crosslinks but also the cutting of the main chain, which might lead to deterioration in mechanical properties. When a gel is present in an amount exceeding 90% by weight, the reclamation becomes insufficient, and a mixture in which a vulcanized rubber pulverized by a shear stress is merely admixed with a thermoplastic resin, is obtained. In such mixture, the vulcanized rubber is poorly compatible with a thermoplastic resin and might cause deterioration of the mechanical properties. As a result, a rubber blend according to the present invention might not be obtained.

The gel measurements presented herein were made in the following manner.

For determining the percentage of the gel content out of the reclaimed rubber, 0.5 g of a test piece of the reclaimed rubber (Piece A) was weighed accurately and immersed in toluene in an amount larger by 100 times (weight) of the test piece for 48 hours to achieve swelling.

The swollen reclaimed rubber test piece (Piece B) was taken and the excessive toluene present on the surface was wiped off, and then placed in a closed tightly container, and then weighed. The swollen reclaimed rubber test piece (Piece B) was taken from the container and dried in vacuo for 12 hours to remove toluene. The test piece thus dried (Piece C) was then weighed.

From the determination conducted as described above, (gel content)=(weight of test piece after swelling followed by drying [Piece C])/(Weight of test piece [Piece A]) was calculated. The results are shown in the column of the gel content.

Thermogravimetry Analysis (TGA)

Thermogravimetry was employed as a method to study the changes occurring in rubber vulcanizates during devulcanization.

The thermogravimetric parameters $T_i$, $T_5$ and $T_p$ and the compositions of TRR in comparison with vulcanizates were determined. The results obtained allowed estimation of the degree of destruction of the polymer chains in response to dynamic de-vulcanization and permitted establishment of the most advantageous conditions of devulcanization in order to obtain the best properties of re-processed rubber for reuse in rubber processing.

The results demonstrated that thermogravimetry is a very useful method for investigation and control of the microwave devulcanization process.

Specimens were extracted with acetone before undergoing the TGA test.

TGA data was obtained by using $N_2$ at a flow rate of 70 ml/min with a heating rate of 10° C./min being applied as follows: heating up the samples to 295° C., remaining under isothermal conditions at this temperature for 10 minutes, then heating up the samples to 510° C., and remaining under isothermal conditions at the latter temperature for another 5 minutes.

The ash content was retrieved indirectly from the TGA analysis.

EXAMPLES

The indicated components were weighed and mixed per ASTM D-3182, using a Farrel Banbury. Subsequently, the gel component content and the swelling degree in each re-processed rubber were determined.

In this example of re-processed rubber, 50-90% (or more) by weight of a toluene-insoluble gel component in a vulcanized rubber is contained residually. This means that the rubber molecules maintained a crosslinking structure.

Example 1

Example 1 demonstrates re-processed rubber in self-contained rubber blends. TRR base was produced while using ethylene copolymers with oxygen pendant groups and the compositions of the rubber crumbs with ethylene copolymers are shown in Table 1.

In addition, lower temperature reclamation was possible under higher shear stress conditions, since the heat stability of the crosslinks was reduced by means of the shear stress given to the vulcanized rubber and the thermoplastic resin.

TRR samples were produced while using ethylene copolymers with oxygen pendant groups. Compositions of such samples are presented in Table 2.

TABLE 2

|  | GTR crumb | E-1 | E-2 | E-3 |
| --- | --- | --- | --- | --- |
| EcoTech 40 mesh | 100 | 100 | 100 | 100 |
| EVA |  | 5 |  |  |
| EAA |  |  | 5 |  |
| EMA |  |  |  | 5 |

In various experiments conducted, the following amounts of de-linking agents were used:
  aromatic resin from about 3% to about 15% by weight, preferably about 8% by weight;
  Red oxide from about 0.2% to about 5% by weight, preferably about 2% by weight;
  Calcium hydroxide from about 0.3% to about 8% by weight, preferably about 3% by weight;
  Tall oil from about 1% to about 10% weight, preferably about 5% by weight;
  Ethylene copolymers with oxygen pendant groups from about 3% to about 20% by weight, preferably about 10% by weight; and
  Processing oil from about 5% to about 30% by weight, preferably about 20% by weight.

A preferred formulation for carrying out the mixing operation comprises a mixture of 100 parts of rubber crumb combined with the de-linking agents. An effective amount of the de-linking agent required, depends on the type of rubber being de-vulcanized and the desired final product.
Note:

| Escorene Ultra FL 00328 (ExxonMobile) | EVA 0328 |
| --- | --- |
| Primacor 3460 Ethylene Acrylic Acid (Dow) | EAA-10 |
| Bynel 4100 (DuPont) | EMA |

In this example of re-processed rubber, at least 83% by weight of a toluene-insoluble gel component in a vulcanized rubber is contained residually. This means that the rubber molecules maintained a crosslinking structure.

Table 3 presents properties of rubber crumb and TRR with modified surface of the end product.

TABLE 3

| Gel content of TRR after de-linking | | | | |
| --- | --- | --- | --- | --- |
| Properties of TRR | GTR crumb | E-1 | E-2 | E-3 |
| Gel content, % | 99 | 85 | 83 | 88 |
| Swelling in toluene, % | 207 | 319 | 326 | 301 |

The rubber composition according to the present example contains 100% of TRR.

TABLE 4

| Compositions of self-contained rubber blends | | | | |
| --- | --- | --- | --- | --- |
| Sample | | E-10 | E-20 | E-30 |
| E-1 | EVA | 100 | | |
| E-2 | EAA | | 100 | |
| E-3 | EMA | | | 100 |

The TRR samples prepared for this series of experiments, were then compounded with curing additives and vulcanized. The blends were made by mixing the re-processed rubber with about 1.5 phr of stearic acid, about 1.5 phr of wax, about 1.3 phr of accelerator, about 1.5 phr of zinc oxide, about 1.1 phr of sulfur and about 1.1 phr of antioxidant. The blends were then cured at 150° C. for 12 minutes. The curing properties of the blends are shown in Table 5 and the physical properties of the cured blends are presented in Table 6.

TABLE 5

| Curing properties of the Self-contained blends (MDR at 150° C./24 min) | | | |
| --- | --- | --- | --- |
| — | E-10 | E-20 | E-30 |
| ML, lb-in | 1.1 | 0.8 | 1 |
| MH, lb-in | 4.8 | 4 | 5.3 |
| S" @MH | 0.5 | 0.6 | 0.6 |
| TS2, min | 3.2 | 4.4 | 3.1 |
| TC 90, min | 5.7 | 7.8 | 6.7 |
| TC 100, min | 11.1 | 15.5 | 12 |

TABLE 6

| Physical properties of the self-contained cured blends | | | |
| --- | --- | --- | --- |
|  | E-10 | E-20 | E-30 |
| Hardness Shore A | 61 | 65 | 63 |
| 100% Modulus MPa | 2.4 | 2.9 | 2.8 |
| Tensile MPa | 5.9 | 5.6 | 5.5 |
| Elongation, % | 243 | 225 | 261 |
| Tear, kN/m | 17 | 18 | 17 |

As may be seen from Table 6, the physical properties of some of the cured blends made with the re-processed rubber samples present good physical properties. The use of only metal oxides or organic acids decreases the properties of cured products.

The resulting TRR displays satisfactory characteristics. For example, a tensile strength above about 5-6 MPa and an elongation percentage above about 200% generally indicate adequate vulcanization. Table 3 indicates that the solution provided by the present invention meets both these requirements.

The vulcanized rubber molded article thus obtained was examined for its physical properties. The strength and the extension determined are shown in Table 2. The vulcanized rubber molded article was also subjected to DIN abrasion test to determine the abrasion resistance, which is shown also in Table 2.

The advantageous effects of the solution provided by the present invention are further discussed below.

Example 2

Re-Processed Rubber in Co-Cured Rubber Blends with Virgin Elastomers

Re-processed rubber in co-cured rubber blends with virgin elastomers has fluidity and compatibility with a virgin rubber and can be dispersed finely throughout the virgin rubber. Accordingly, the re-processed rubber described above is capable of binding easily with the virgin rubber, resulting in rubber compositions containing such blends that have good rubber properties (Table 7).

In addition, since a rubber composition according to the present invention is a re-processed rubber which may be added to a virgin rubber, by doing so it replaces a corresponding amount of virgin rubber which consequently is saved. Depending on the performance requirements, at least about 10 phr to about 40 phr of fresh rubber may be substituted by the re-processed rubber of the present invention, without experiencing any significant loss of properties.

Preferably, the re-processed rubber would bind chemically to a virgin rubber and/or to a thermoplastic resin at a radical active point, at the surface of the reclaimed rubber. In such a manner, a strong binding between the reclaimed rubber and a virgin rubber and/or the thermoplastic resin is achieved, while exhibiting novel properties that have not been experienced in the past.

A rubber composition in accordance with an embodiment of the present invention was produced having a weight ratio between the re-processed rubber and the virgin rubber of 1:4. A vehicle tire was then produced using this rubber composition for a tread thereof (tire 1). Rubber compounds that contain up to about 50 phr of re-processed rubber prepared in accordance with a method provided by the present disclosure may be utilized in manufacturing high performance rubber products. The re-processed rubber would typically be employed in such blends at a level of about 10 phr to about 50 phr and a fresh rubber from about 60 phr to about 90 phr. The sulfur-curable virgin rubber will typically be natural rubber, polybutadiene rubber, styrene-butadiene rubber, or a blend thereof.

TABLE 7

Compositions of virgin rubber and TRR

|  | Control | E-14 | E-15 | E-16 | Reference |
|---|---|---|---|---|---|
| SBR 1712 | 55 | 55 | 55 | 55 | 55 |
| SBR 1500 | 60 | 55 | 50 | 45 | 55 |
| Masterbatch E-1 |  | 10 | 20 | 30 |  |
| Rubber crumb 40 mesh |  |  |  |  | 10 |
| Struktol TH-100 | 2 | 2 | 2 | 2 | 2 |
| Zinc oxide | 3 | 3 | 3 | 3 | 3 |

TABLE 7-continued

Compositions of virgin rubber and TRR

|  | Control | E-14 | E-15 | E-16 | Reference |
|---|---|---|---|---|---|
| Carbon N-330 | 50 | 50 | 50 | 50 | 50 |
| Stearine | 2 | 2 | 2 | 2 | 2 |
| Riowax 721 | 2 | 2 | 2 | 2 | 2 |
| Flectol H | 2 | 2 | 2 | 2 | 2 |
| 6PPD | 2 | 2 | 2 | 2 | 2 |
| Sulfur | 2 | 2 | 2 | 2 | 2 |
| Santocure MBS | 1.3 | 1.3 | 1.3 | 1.3 | 1.3 |

The samples of the re-processed rubber made in this series of experiments were then compounded with a fresh SBR 1712 and SBR 1500 rubber, and cured at 150° C. for 15 minutes. The curing properties of the blends are presented in Table 8 and the physical properties of the cured blends are presented in Table 9.

TABLE 8

Properties of co-cured blends (MDR at 150° C./24 min)

|  | Control | E-14 | E-15 | E-16 | Reference |
|---|---|---|---|---|---|
| ML, lb-in | 1 | 1.2 | 1 | 1.6 | 2.1 |
| MH, lb-in | 9.2 | 8.6 | 8 | 8.2 | 7.6 |
| S" @MH | 1 | 1 | 1.15 | 1.3 | 1.5 |
| TS2, min | 5.3 | 4.8 | 5.7 | 6 | 5.9 |
| TC 90, min | 13.9 | 13.6 | 14.6 | 14.8 | 14.6 |

TABLE 9

Physical properties of the co-cured blends

|  | Control | E-14 | E-15 | E-16 | Reference |
|---|---|---|---|---|---|
| Hardness Shore A | 60 | 60 | 60 | 60 | 65 |
| 100% Modulus MPa | 1.7 | 1.9 | 1.8 | 1.7 | 1.3 |
| 200% Modulus MPa | 4.1 | 4.4 | 4 | 3.9 | 3 |
| 300% Modulus MPa | 7.6 | 7.8 | 7.4 | 7.2 | 6.1 |
| Tensile MPa | 18.4 | 17.9 | 14.6 | 13.8 | 12.4 |
| Elongation, % | 534 | 536 | 521 | 509 | 437 |
| Tear Die C, kN/m | 43 | 42 | 41 | 40 | 32 |
| DIN abrasion loss 1 kg, cc | 94 | 87 | 101 | 98 | 134 |

As may be seen from Table 9, the physical properties of some of the cured blends made with the re-processed rubber were equivalent to those made with only virgin rubber. For instance, the 100% Modulus, 200% Modulus, 300% Modulus and percent elongation measured in Examples E14 and E15 were very similar to those found in the control sample using only virgin rubber.

The reference sample has also exhibited strength, extension and abrasion resistance all of which were poorer when comparing with Sample E-14 to E-16, since it was a blend with a simple rubber powder.

On the other hand, the vulcanized rubber molded articles obtained from samples E14-E16 exhibited performance that was almost equivalent to that of the vulcanized rubber molded article obtained from the control sample, which was made only from a virgin rubber.

Example 3

Example 3 relates to samples containing re-processed rubber within self-contained rubber blends using acid precursor as active de-linking agent Diammonium phosphate (DAP) and Tricresylphosphate as swelling agent (TOP).

TABLE 10

Compositions of Rubber crumb with DAP

|  | E-7 | E-8 |
|---|---|---|
| EcoTech 40 mesh | 100 | 100 |
| Diammonium phosphate | — | 2 |
| Trioctyl Phosphate | 2 | 2 |

The delinking agents used, are the same as those used in Example 1.

TABLE 11

Gel content of TRR following de-linking operation

|  | E-7 | E-8 |
|---|---|---|
| Gel content, % | 89 | 81 |
| Swelling in toluene, % | 325 | 391 |

TABLE 12

Compositions of self-contained rubber blends

|  | E-71 | E-81 |
|---|---|---|
| E-7 | 100 |  |
| E-8 |  | 100 |

The curing groups used for these samples are the same as those used in Example 1.

TABLE 13

Properties of the cured self-contained blends (MDR at 150° C./24 min)

|  | E-71 | E-81 |
|---|---|---|
| ML, lb-in | 0.9 | 0.9 |
| MH, lb-in | 4.2 | 5.1 |
| S" @MH | 0.5 | 0.6 |
| TS2, min | 3.1 | 2.9 |
| TC 90, min | 4.5 | 5.3 |
| TC 100, min | 7.3 | 8.2 |

TABLE 14

Physical properties of the self-contained blends

|  | E-71 | E-81 |
|---|---|---|
| Hardness Shore A | 62 | 57 |
| 100% Modulus MPa | 2.1 | 2.6 |
| 200% Modulus MPa | 4.5 | 6.0 |
| Tensile MPa | 5.9 | 6.5 |
| Elongation, % | 232 | 260 |
| Tear, kN/m | 20 | 20 |

The re-processed rubber of the present invention may be re-compounded and re-cured by itself or be co-cured with virgin elastomer. The re-processed rubber of the present invention demonstrates good technical properties: scorch resistance, retain modules, and tensile and hardness of virgin rubber compounds.

Also, re-processed rubber retains over 80% of the dynamic and physical properties of the rubber, with the obvious advantage of being able to be vulcanized with low amounts of sulfur and accelerator.

By blending re-processed rubber in the amount of 10% to 40% of the total blend weight with virgin compounds, the resulting blend possesses superior properties at significantly lower cost than when compared with using only virgin rubber compounds.

The present invention has been described using detailed descriptions of embodiments thereof that are provided by way of example and are not intended to limit the scope of the invention in any way. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

The invention claimed is:

1. A method for preparing a reprocessed rubber from thermoset rubber particles, comprising the steps of:
providing a plurality of thermoset rubber particles;
inducing dynamic swelling and dynamic compatibilization of said plurality of rubber particles;
admixing at least one de-linking agent with the swelled and wetted rubber particles, wherein said at least one de-linking agent comprises a combination of a transitional metal oxide and alkaline-earth metal oxide/hydroxide with an acid functionalized polymer and/or one or more monomeric organic/inorganic acids or an acid precursor; and
wherein the method is further characterized in that said step of admixing the at least one de-linking agent is carried out under thermo-mechanical mixing.

2. The method of claim 1, further characterized in that said step of admixing at least one de-linking agent is carried out in a presence of one or more hydro-aromatic compounds.

3. The method of claim 1, wherein said step of inducing dynamic swelling and dynamic compatibilization of said plurality of particles, comprises using at least one compound from the group that consists of a trialkyl phosphate ester, tall oil, naphtenic oil, paraffinic oil, aromatic oil, and any combination thereof.

4. The method of claim 1, wherein the step of admixing at least one de-linking agent comprises admixing a monomeric acid.

5. The method of claim 4, wherein said monomeric acid is selected from among a linear alkylbenzenesulfonic acid (LABSA), a boric acid, a phthalic acid or anhydride, a tall oil or rosin being a mixture of monocarboxylic acids.

6. The method of claim 1, wherein the step of admixing at least one de-linking agent comprises admixing an acid precursor selected from among a diammonium phosphate, monoammonium phosphate, ammonium polyphosphate and ammonia, in the presence of calcium hydroxide.

7. The method of claim 2, wherein said one or more hydro-aromatic compounds are selected from among cumarone, phenolic resin and aromatic oil.

8. The method of claim 1, wherein said transitional metal oxide comprises at least one metal salt precursor that is operative as a catalyst during said admixing to activate polysulfidic crosslink scission via nucleophilic breakdown and oxidation.

9. The method of claim 1, wherein said transitional metal oxide and alkaline-earth metal oxide/hydroxide are selected from a group that consists of: iron (III) oxide, manganese oxides, cobalt oxide, calcium oxide/hydroxide, acid functionalized polymer, monomeric acids as salt precursors and any combination thereof.

10. A reprocessed rubber produced from thermoset rubber particles by carrying out the method of claim 1.

11. A method for converting a thermoset rubber particles into a reprocessed rubber, said method comprising the steps of:
   a) adding at least one dynamic swelling and a dynamic compatibilization agent to the thermoset rubber particles;
   b) adding at least one dynamic de-linking agent for selectively modifying the surface of said thermoset rubber particles, wherein said at least one de-linking agent comprises a combination of a transitional metal oxide and alkaline-earth metal oxide/hydroxide with an acid functionalized polymer and/or one or more monomeric organic/inorganic acids or an acid precursor; and
   c) carrying out a thermo-mechanical mixing of said at least one dynamic de-linking agent and the thermoset rubber particles.

12. A reprocessed rubber produced from thermoset rubber particles by carrying out the method of claim 11.

13. A reprocessed rubber produced from a plurality of thermoset rubber particles and characterized in that each of said plurality of rubber particles has a core and a shell, and wherein the shell of each of the plurality of rubber particles is a de-linked rubber.

14. A reprocessed rubber according to claim 13, wherein each core of the plurality of rubber particles comprises vulcanized rubber and each shell of the plurality of rubber particles includes de-vulcanized rubber.

15. A reprocessed rubber according to claim 13, wherein each core of the plurality of rubber particles comprises thermoset rubber gel and each shell of the plurality of rubber particles includes de-vulcanized rubber.

16. A reprocessed rubber according to claim 15, wherein the thermoset rubber gel content of the plurality of rubber particles is at least about 80%.

17. A reprocessed rubber produced from thermoset rubber particles by carrying out the method of claim 11.

* * * * *